Figure 1:
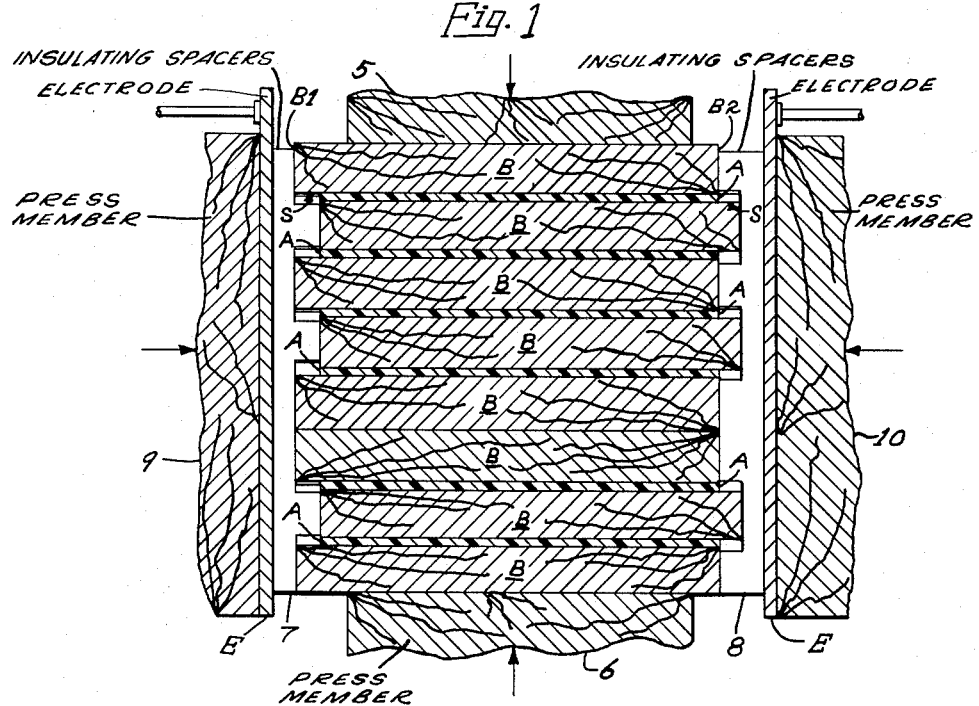

Feb. 1, 1966     B. COULTER ETAL     3,232,811
PROCESS OF BONDING LUMBER BY PARALLEL
HIGH FREQUENCY HEATING
Filed Sept. 26, 1960     2 Sheets-Sheet 1

INVENTORS.
BERT COULTER
JULIUS W. MANN
HERBERT B. MCKEAN
GEORGE F. RUSSELL
JOHN W. SMITH
BY
ATTY.

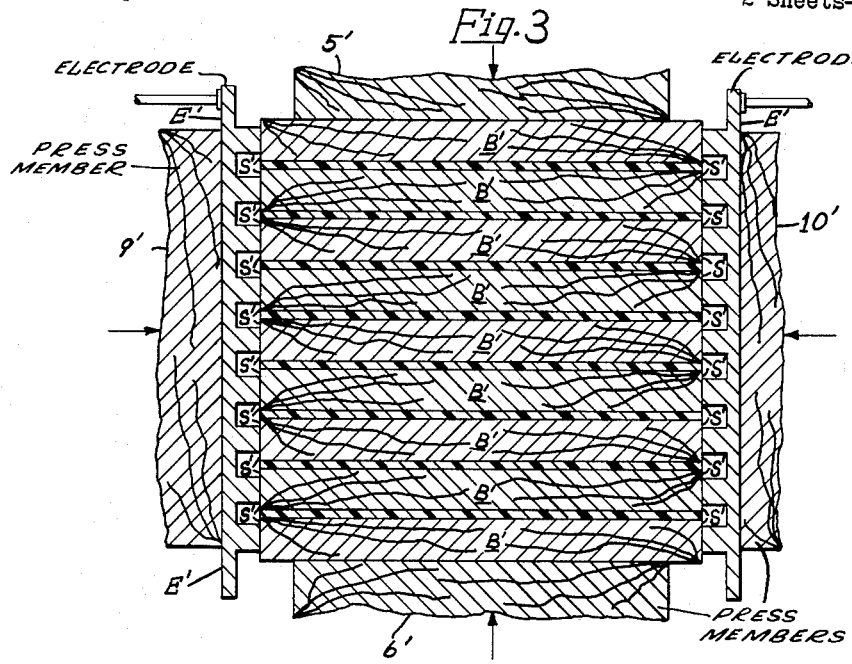

3,232,811
PROCESS OF BONDING LUMBER BY PARALLEL HIGH FREQUENCY HEATING
Bert Coulter, Lewiston, Idaho, Julius W. Mann, Tacoma, Wash., Herbert B. McKean, Lewiston, Idaho, and George F. Russell, Tacoma, and John W. Smith, Clarkston, Wash.; said Bert Coulter, Herbert B. McKean, and John W. Smith, assignors to Potlatch Forests, Inc., Lewiston, Idaho, a corporation of Delaware
Filed Sept. 26, 1960, Ser. No. 58,573
7 Claims. (Cl. 156—273)

The present invention relates to a process of bonding lumber by parallel high frequency heating. The use of high frequency electric current directed parallel to the adhesive line is described in U.S. Letters Patent 2,434,573 to Mann and Russell. However, all previous work has not, prior to our invention, resulted in practical realization of bonding with the low cost alkaline catalyzed phenol formaldehyde adhesives. This adhesive is commonly used for bonding exterior grade plywood. It has great advantages both from its waterproof characteristics and its low cost. For example, it may now be obtained ready mixed for about one third the cost of the so-called acid catalyzed phenol adhesives and about one fifth the cost of melamine adhesives or phenol-resorcinal adhesives. The alkaline catalyzed phenol formaldehyde adhesive is in a cost range comparable to casein glues with the great added advantage of being useful in bonding "exterior" wood products where the casein glues cannot be used.

Heretofore it has been generally considered that the high temperature curing alkaline catalyzed phenol formaldehyde adhesive could not be employed where the heating and curing of the adhesive was done by high frequency lines of force parallel to the adhesive plane.

We have invented a process whereby we are able to make economic use of low cost alkaline catalyzed phenol formaldehyde adhesive with high frequency heating of the adhesive by lines of force parallel to the adhesive layer.

The purpose of our invention is to bond a plurality of boards together by means of a thermo-setting adhesive layer, using high frequency dielectric heating by the steps of coating only the meeting surfaces of the boards with an alkaline catalyzed phenol formaldehyde adhesive, leaving a portion of the surfaces at a side edge portion of each board free of adhesive, assembling the boards face to face with the adhesive free surface portions of one board across the boards from like adhesive free surface portions of an adjacent board clamping the boards between opposed electrodes at their side edges thereby to provide greater air gaps from the electrodes to the adhesive than from the electrodes to the board edges and applying high frequency electric potential across the electrodes.

A further and more specific object of our invention is to carry out the application of the high frequency electric potential across the electrodes in a manner to increase the potential gradually as the curing progresses.

Our invention contemplates the application of the thermosetting alkaline catalyzed phenol formaldehyde adhesive layer between the boards in such way that the meeting faces only have adhesive thereon. Portions of one board surface projecting beyond the side edges of adjacent boards are kept free of adhesive and the electrodes are kept in spaced relation to the board edges and the adhesive spacer elements along the edges of the boards so that greater spacing is provided from the electrodes to the adhesive, than from the electrodes to the board edges adjacent to the adhesive line.

In order that the nature and advantages of our invention will be more fully understood reference is made to the following detailed description and the accompanying drawings wherein the apparatus used in carrying out the process is illustrated schematically.

Figure 2:
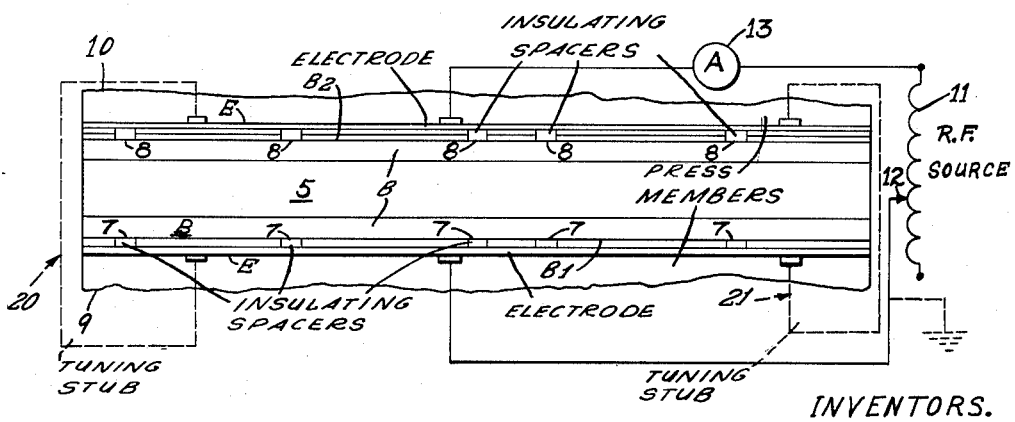

In the drawings:
FIGURE 1 is a sectional view taken crosswise of a series of boards being bonded together by the process of our invention;
FIGURE 2 is a somewhat diagrammatic plan view looking downward on a hook up of the electrode configuration containing the components described herein for carrying out the process; and
FIGURE 3 is a view similar to FIGURE 1 showing a modification.

In the drawings the several boards B are shown for purposes of illustration as being bonded into two groups. The upper group consists of five boards and the lower group consists of three boards. The meeting faces of the boards B in each group have adhesive A between them but this adhesive stops short of the portions of each board that projects beyond the adjacent boards. The adhesive layers A are shown exaggerated in thickness in FIGURE 1 of the drawings. The assembled boards B are pressed together between an upper member 5 and a lower member 6, both of which are of insulating material. At intervals along the side edges $B_1$ and $B_2$ of the boards B the spacers 7 and 8 are placed to space the electrodes E from the boards. These spacers are narrow pieces of dielectric such as that described in the patent of John W. Smith, U.S. Patent No. 3,038,511, granted June 12, 1962, for patent on a Spacing Apparatus for Parallel Bonding of Boards. The amount of offset edgewise of one board with respect to adjacent boards may vary greatly, depending upon the future use of the unit of bonded boards. For some purposes the units are interfitted together with like units, while for other purposes the extended portions at the edges of the boards may be removed to make accurately dimensioned beams. Members 9 and 10 press the electrodes E firmly against the spacers 7 and 8. Where the load of boards B and the electrodes E are in position, as shown in FIGURE 1, then high frequency alternating current is applied to the electrodes at a potential sufficient to supply the energy necessary to heat the adhesive to curing temperature. We have found that it is essential to provide spacing between the electrodes and the adhesive as an air gap. It is not essential that the electrodes be spaced from the board edge so long as air gaps are provided between the adhesive and the electroes along surfaces of the boards.

According to our invention the boards are provided with adhesive between their meeting faces with at least a portion S of one board surface next to an electrode devoid of adhesive adjacent to its edge and that board, or the adjacent board, has an uncoated portion S which projects beyond the edge of the adhesive layer adjacent to the electrode. These exposed surfaces provide air spaces from the electrode surface along the wood to the adhesive layer regardless of whether the electrodes directly contact the wood or are separated therefrom.

It appears that the directing of the flow of electrical energy through the higher resistance paths along the board surfaces between the electrodes and the edge of the adhesive functions to avoid arcing and to establish such uniformity of distribution of the flow as to effect a cure of all of the adhesive layers. In preparing the boards for bonding together they are stabilized as to moisture content to about 10–12 percent moisture. At this dryness the dielectric constant of the wood is between two and three. The tendency of the electrical energy leaving the electrode is to follow the wood, but it is well known that high frequency electrical current tends to follow the surface of solid material. This leads the energy to the adhesive layer along the wood surface with very little heating of the wood except at the surface. The adhesive layer has a much higher conductivity than the wood or air so that the flow of energy across the material under treatment concentrates in the adhesive layer heating it to the curing temperature.

Mann and Russell in their United States Patent No. 2,434,573 disclose the separation of the electrodes from the adehsive layer by caul boards that cover the faces of the electrodes. They also disclose that air space alone may be used between the electrodes and the several layers of wood and adhesive in parallel bonding. We have found however that neither of these methods were effective practically in the bonding of boards with alkaline catalyzed phenol formaldehyde adhesives. It is only when the method is carried out with the approach to the side edges of each adhesive layer extending along an exposed uncoated surface of wood from the edge of the adhesive layer toward the adjacent electrode that effective uniform curing of this adhesive has been obtained.

By bringing the edges of the boards to be joined closer to the electrodes than the edges of the glue line we make it necessary for the field lines of force to first follow the wood surface (which is more conductive than air) and then reach the more highly conductive adhesive plane A. Each adhesive plane thus has a defined path by which the field lines of force are brought to it. If one adhesive layer is more conductive than another it will attract more of the field lines of force but not all, thus heating up faster until its conductivity drops to the level of the other adhesive layers. In this connection we have developed another unique step in the process that is highly beneficial in completing the cure. As heating takes place in the load its conductivity and dielectric constant changes. In order to maintain full generator output during cure, we further apply a change in the output to compensate for loss due to dielectric change as a compensation so as to maintain a constant current output to the load. A representation of one means of accomplishing this is represented in FIGURE 2. FIGURE 2 also shows application to the electrodes of either a double ender or a single ender high frequency generator.

By making it possible to use alkaline catalyzed phenol formaldehyde adhesives and by confiining the necessary heating primarily to the adhesive plane our process provides great economies in the uniting of boards to form laminated decking or beams.

A specific example of the process has been carried out as follows:

The boards to be bonded were first seasoned to an average moisture content of 10% by weight with a maximum of 12% moisture content in any one piece. The surfaces were finished smooth. Next the alkaline catalyzed phenol formaldehyde adhesive was applied to certain of the boards as they were laid up in a stack. The boards, eight inches wide of cedar, were laid up first with an uncoated board on the bottom. The next board was coated on both sides with the adhesive. This adhesive extended from one side edge to a line about one inch inward from the opposite side edge. This board was laid on the first board with the uncoated portions only of it projecting beyond the corresponding side edge of the bottom board. On top of this coated board another uncoated board was laid so as to leave the uncoated portion of the top surface of the second board exposed. Another unit was laid on top of the first unit in the same manner and two other units of three boards each were laid on top of this second unit. In each unit the adhesive was applied in the manner described for the first unit. Next spacers were applied to the sides of the stack of units, about 4 feet apart along each side. The stack of units was then moved into position in the press on top of the press member 6 with the press member 5 raised. Then press member 5 was lowered to rest on the stack. The electrodes E were then moved inward toward each other and pressed against the spacers by the members 9 and 10. The pressure applied by the members 9 and 10 is enough to hold the several boards in alignment. The top press member 5 was then forced down with sufficient pressure (upwards of 100 p.s.i.) to insure good contact of the meeting faces of the boards. The high frequency current was then applied. As indicated in the drawings the current is supplied through an auto-transformer 11 which has its adjustable contact 12 manually controlled. An ammeter 13 in the output lead to the ungrounded electrode E indicates the amount of current being used. The operator adjusted the contact 12 to increase the potential across the electrodes E and kept the current reading of the ammeter 13 from dropping until the curing was complete. The curing time was about four minutes. The stack was then removed and the units were inspected and tested. The bonds were found to be good in all units.

Using Douglas fir boards, another stack of units was formed and bonded in the same manner. It was found that a slightly longer cure time was needed for the Douglas fir.

The term parallel high frequency heating is generally applied where the high frequency field is parallel to the adhesive plane or approaches parallelism to the adhesive plane. Heretofore parallel high frequency heating has been said not to work at all with high temperature glues (Forest Products Research and Industries in the United States by W. W. Varossieau, Ph. D., 1954, p. 338). The alkaline catalyzed phenol formaldehyde adhesive is a high temperature glue. By following our process we have been able commercially to bond the boards together with this adhesive and to obtain a good merchantable product at an adhesive cost of the order of $2.00 per thousand board feet of product such as that described in the example given. This compares with a cost of $5.00 per thousand board feet and upward when acid catalyzed phenol, or melamine adhesives are used. Our power costs are of the order of one-tenth the cost of power for perpendicular bonding, using high frequency, because that requires heating all the wood.

The modification illustrated in FIGURE 3 embodies the same process but in this case the electrodes E' and the boards are brought directly together so that the spacers are eliminated. However, the electrodes are spaced from the adhesive layers, and wood surfaces S', devoid of adhesive, are found leading from the electrodes to each of the adhesive layers. In this, as in the case where spacers are used, there is a wood surface that extends from the adhesive toward the electrode.

In FIGURE 2 dotted lines at the opposite extremities of electrodes E designated as stub 20 and stub 21 are representative of inductance means employed to even out the distribution of the radio frequency voltages along the length of the electrodes E for the wave length employed, so that no area of the adhesive lines along their length are subjected to substantially differing R.F. standing wave voltages which might otherwise adversely affect the simultaneousness of setting the adhesive along the entire package.

It is belived that the nature and advantages of our invention will be apparent from the foregoing description.

Having described the invention, we claim:

1. The proces of bonding a plurality of boards together by means of a thermo-setting alkaline catalyzed phenol formaldehyde adhesive layer applied between the boards prior to bonding, the boards having smooth finished surfaces and a maximum moisture content of 12 percent, which comprises positioning the boards between opposed electrodes positioned perpendicularly relative to the proposed glue lines, the adhesive being so applied between the boards as to provide air gaps along uncoated board surfaces between each electrode and the adjacent edge of each adhesive layer, subjecting the boards to pressure in a direction perpendicular to the glue line and applying high frequency electric potential across the boards sufficient to heat the adhesive to curing temperature, said potential being maintained for a duration of time sufficient to effect curing of the adhesive.

2. The process defined in claim 1 wherein the potential across the electrodes is gradually increased until the cure of the adhesive is completed.

3. The process of bonding a plurality of boards together by means of a high temperature setting alkaline catalyzed phenol-formaldehyde adhesive layer between the boards which comprises assembling the boards with their meeting surfaces only provided with a layer of the adhesive therebetween the boards having smooth finished surfaces and a maximum moisture content of 12 percent, positioning the boards edgewise between opposed electrodes with the adhesive lines perpendicular to the electrodes with the electrodes separated from the adhesive but with uncoated board surface extending from the adjacent edge of each adhesive layer toward each electrode subjecting the boards to pressure in a direction perpendicular to the adhesive lines, and applying high frequency electrical potential across the electrodes sufficient to heat the adhesive to curing temperature the potential being maintained for a duration sufficient to effect curing of the adhesive.

4. The process of bonding a plurality of boards together with a high temperature setting alkaline catalyzed phenol formaldehyde adhesive by parallel high frequency heating wherein the boards have smooth-finished surfaces and a maximum moisture content of 12 percent, which comprises coating one of the meeting surfaces of adjacent pairs of said boards with the adhesive, leaving a portion of the opposed surfaces adjacent to a side edge portion of each board free of adhesive, assembling the boards with the adhesive free surface portions of one board across the board assembly from like adhesive free surface portions of the adjacent board, clamping the boards edgewise between opposed electrodes positioned perpendicularly relative to the proposed glue lines, thereby providing air gaps from the electrodes to the adhesive alongside said opposed adhesive free surface portions, subjecting the boards to pressure in a direction perpendicular to the glue lines and applying high frequency electric potential to the electrodes sufficient to heat the adhesive to curing temperature, said potential being maintained for a duration of time sufficient to effect curing of the adhesive.

5. The process of bonding a plurality of boards together with a high temperature setting alkaline catalyzed phenol formaldehyde adhesive by parallel high frequency heating, the boards having smooth finished surfaces and a maximum moisture content of 12 percent, which comprises coating only the meeting surfaces of each board with the adhesive, leaving a portion of the opposed surfaces adjacent to a side edge portion of each board free of adhesive, assembling the boards with the adhesive free surface portions of one board across the board assembly from like adhesive free surface portions of the adjacent board or boards, clamping the boards edgewise between but out of contact with opposed electrodes positioned perpendicular relative to the proposed glue lines, thereby providing greater air gaps from the electrodes to the adhesive than from the electrodes to the board edges and applying a high frequency potential to the electrodes sufficient to heat the adhesive to curing temperature, the potential being maintained for a duration of time sufficient to effect curing of the adhesive.

6. The process defined in claim 3 wherein the potential applied to the electrodes is gradually increased as the curing of the adhesive progresses at a rate sufficient to maintain the current flow at least equal to the initial current flow until the cure is completed.

7. The process of bonding a plurality of boards together with a high temperature setting alkaline catalyzed phenol formaldehyde adhesive by parallel high frequency heating, the boards having smooth finished surfaces and a maximum moisture content of 12%, which comprises coating only the meeting surfaces of said boards with the adhesive, leaving a portion of the opposed surfaces adjacent to a side edge portion of each board free of adhesive, assembling the boards with the adhesive free surface portions of one board across the board assembly from like adhesive free surface portions of the adjacent board or boards, applying light pressure to the boards perpendicular to the adhesive coated surfaces, then clamping the boards edgewise between opposed electrodes positioned perpendicular relative to the proposed glue lines thereby providing air gaps from the electrodes to the adhesive alongside said opposed adhesive free surface portions, then increasing the pressure on the boards perpendicular to the adhesive coated surfaces and finally applying a high frequency potential to the electrodes sufficient to heat the adhesive to curing temperature, the potential being maintained for a duration of time sufficient to effect curing of the adhesive.

References Cited by the Examiner

UNITED STATES PATENTS

| 2,434,573 | 1/1948 | Mann et al. | 154—126.5 |
| 2,437,981 | 3/1948 | Stephan et al. | 260—57 |
| 2,457,498 | 12/1948 | Russell et al. | 156—273 |
| 2,571,604 | 10/1951 | Payzant | 154—116 |
| 2,591,771 | 4/1952 | Bergey | 156—273 |
| 3,016,316 | 1/1962 | Olson | 154—293 XR |
| 3,038,511 | 6/1962 | Smith | 144—281 |

OTHER REFERENCES

Russell and Mann: "Radio-Frequency Technology in Wood Application," Transaction of the A.S.M.E., August 1944, pp. 563–67 (TJ 1.A7).

EARL M. BERGERT, *Primary Examiner.*

ALEXANDER WYMAN, CARL F. KRAFFT,
*Examiners.*